(12) United States Patent
Hajek

(10) Patent No.: US 12,415,314 B2
(45) Date of Patent: Sep. 16, 2025

(54) PRINTING HEAD ASSEMBLY FOR A 3D PRINTER AND A 3D PRINTER WITH THIS ASSEMBLY

(71) Applicants: Libor Sitar, Krasno nad Becvou (CZ); Vaclav Hajek, Brno (CZ)

(72) Inventor: Vaclav Hajek, Brno (CZ)

( * ) Notice: Subject to any disclaimer, the term of this patent is extended or adjusted under 35 U.S.C. 154(b) by 136 days.

(21) Appl. No.: 18/550,181

(22) PCT Filed: Mar. 11, 2022

(86) PCT No.: PCT/CZ2022/050028
§ 371 (c)(1),
(2) Date: Sep. 12, 2023

(87) PCT Pub. No.: WO2022/188905
PCT Pub. Date: Sep. 15, 2022

(65) Prior Publication Data
US 2024/0157639 A1    May 16, 2024

(30) Foreign Application Priority Data
Mar. 12, 2021 (CZ) ............... PV 2021-124

(51) Int. Cl.
*B29C 64/321* (2017.01)
*B29C 64/118* (2017.01)
(Continued)

(52) U.S. Cl.
CPC .......... *B29C 64/209* (2017.08); *B29C 64/118* (2017.08); *B29C 64/241* (2017.08); *B29C 64/321* (2017.08); *B33Y 30/00* (2014.12)

(58) Field of Classification Search
CPC .................................. B29C 64/321
See application file for complete search history.

(56) References Cited

U.S. PATENT DOCUMENTS 8,827,684 B1   9/2014   Schumacher et al.
10,807,307 B2   10/2020   Isupov
(Continued)

FOREIGN PATENT DOCUMENTS

CN   207789733 U   8/2018
CN   209794566 U   12/2019
(Continued)

OTHER PUBLICATIONS

European Patent Office, International Search Report, dated Sep. 26, 2022, in International Patent Application No. PCT/CZ2022/050028, filed Mar. 11, 2022.
(Continued)

*Primary Examiner* — Timothy Kennedy
(74) *Attorney, Agent, or Firm* — Thedford I. HItaffer; Hitaffer, PLLC

(57) ABSTRACT

A 3D printer printing head assembly comprises a printing head carrier and a printing head, which comprises at least two printing units implemented such that they are mutually offset in the print plane. Each printing unit comprises an extruder, filament feeder, cooling mechanism, and nozzle. The printing units at a mutual spacing are adapted for simultaneous printing in different, mutually offset print planes. This assembly therefore allows for printing in multiple planes simultaneously. Furthermore, the object of the invention is a 3D printer with this assembly.

9 Claims, 8 Drawing Sheets

(51) Int. Cl.
  *B29C 64/209*  (2017.01)
  *B29C 64/241*  (2017.01)
  *B33Y 30/00*  (2015.01)

(56) References Cited

U.S. PATENT DOCUMENTS

| | | | |
|---|---|---|---|
| 2004/0141024 A1* | 7/2004 | Silverbrook | B33Y 10/00 |
| | | | 345/419 |
| 2016/0107332 A1* | 4/2016 | Grivetti | B28B 3/2636 |
| | | | 425/375 |
| 2017/0157831 A1 | 6/2017 | Mandel et al. | |
| 2019/0184633 A1 | 6/2019 | Sydow et al. | |
| 2020/0147873 A1 | 5/2020 | Lewis et al. | |

FOREIGN PATENT DOCUMENTS

| | | | | |
|---|---|---|---|---|
| CN | 212097534 U | 12/2020 | | |
| CN | 112373012 A | 2/2021 | | |
| EP | 2772347 A1 | 9/2014 | | |
| EP | 3766666 A1 | 1/2021 | | |
| WO | WO-2015188017 A1 * | 12/2015 | | B29C 70/382 |
| WO | WO-2017182928 A1 * | 10/2017 | | B29C 64/20 |
| WO | 2020212519 A1 | 10/2020 | | |
| WO | 2021022624 A1 | 2/2021 | | |
| WO | 2021025939 A1 | 2/2021 | | |

OTHER PUBLICATIONS

European Patent Office, Written Opinion, dated Sep. 26, 2022, in International Patent Application No. PCT/CZ2022/050028, filed Mar. 11, 2022.

* cited by examiner

PRINTING HEAD ASSEMBLY FOR A 3D PRINTER AND A 3D PRINTER WITH THIS ASSEMBLY

CROSS-REFERENCE TO RELATED APPLICATIONS

This application, filed under 35 USC 371, is a United States National Stage Application of International Application No. PCTCZ2022050028, filed Mar. 11, 2022, which claims priority to CZ Application No. PV 2021-124, filed on Mar. 12, 2021, the disclosures of which are incorporated herein by reference in their entirety.

TECHNICAL FIELD

The present invention relates to the field of additive 3D printing, and in particular describes an innovative design of a printing head assembly for 3D printing suitable, for example, for printing modular building elements.

BACKGROUND OF THE INVENTION

In the current state of the art, there are known printing head solutions for 3D printing that are adapted to move in three mutually perpendicular axes. The printing head comprises one or more extruders into which printed material, for example in the form of filament, is introduced, which is melted in the extruder and pushed through a nozzle of a defined diameter, which determines the thickness of the deposited layer.

In the current state of the art, there are also known solutions using multiple extruders located in one row on one printing head, where the use of an additional extruder allows, for example, printing with multiple filaments and thus different materials.

In another well-known arrangement, multiple printing heads are located on different independent axes. This solution allows for faster printing of the printed object.

Additive 3D printing technologies are used, for example, in the production of prototypes, engineering components, construction, or special biotechnology applications.

A wide range of materials are used for 3D printing in the construction industry, the application of which largely depends on the printing technology. For printing monolithic structures, for example, silicate composite material is used by extrusion method or 3D printing using a robotic arm. In these cases, the print mixture is most often mixed using a screw extruder or is prepared before outside the printing head. For printing blocks, for example, frame 3D printers are used, where the size of the printed object is limited by the dimensions of the frame.

A disadvantage of the disclosed 3D printing solutions is their low speed. In the construction industry, the low speed of 3D printing is particularly evident when building from individual 3D printed blocks.

In the new use of additive 3D printing technology in the construction industry, the need for a printing head that can quickly and efficiently print building elements such as modular building blocks has become apparent.

SUMMARY OF THE INVENTION

The above shortcomings are eliminated to a certain extent by a printing head assembly for a 3D printing device comprising a printing head carrier and a printing head comprising at least two mutually spaced apart printing units in the print plane comprising an extruder, a filament feeder, a cooling mechanism, and a nozzle, the essence of which is that the mutually spaced apart printing units are adapted to print simultaneously in different, mutually offset print planes. In a basic embodiment with just two mutually spaced apart printing units, the first printing unit prints a certain repeating motif in the first print plane and the second printing unit prints the same motif in the second print plane, which is displaced higher than the first print plane by the height of the printed layer. At the same time, the two printing units are mutually offset in the print plane such that the second printing unit prints this motif with a certain delay. Simultaneous printing in different planes can be used to speed up the printing, especially for objects, such as large-format objects, with at least partially regular repeating internal structure.

The printing head is thus adapted to print simultaneously in at least two different, mutually offset, print planes. Printing in more than two print planes simultaneously is also possible.

The mutual spacing of the printing head printing units ensures that as the printing head passes over each print region, there is a time gap when depositing each print layer. In this way, each subsequent layer can be deposited on top of the already solidified previous layer. The size of the spacing depends, for example, on the printed motif. Preferably, the mutual spacing of the printing units is adjustable.

Preferably, the mutual spacing of the printing units, i.e., the spacing in the print plane, is greater than or equal to the width of the extrusion, more preferably an integer multiple of the width of the extrusion; depending on the pattern or motif being printed, it may be significantly greater, for example, more than ten times or more than one hundred times greater, etc. In order to print a continuous area, if such an area is needed, the printing head may be displaced in a given direction in the print plane by the width of the extrusion until the area between the individual nozzles is filled.

The cooling mechanism is used to influence the rate of solidification, the intensity of cooling is preferably also adjustable, especially with regard to the operating temperature, which depends on the material used. Standard operating temperatures range from 200 to 260° C. Cooling can be carried out by fans located, for example, on the lateral side of the extruder. Preferably, cooling is carried out by cooling nozzles supplying compressed air. This makes it possible to carry out cooling in a specific location as required. In the case of a closed printing box, air must then be exhausted. The entire printer can be stored in such a printing box, and it is also possible for the printing box to serve as the printer structure. When using compressed air nozzles as the cooling mechanism, the printing head is preferably connected by air line or lines to a compressed air source such as a compressor, pump, or cylinder.

The height of the printed layer determines the size of the mutual spacing of the individual printing units in a plane perpendicular to the print plane, i.e., it determines the distance between the print planes. The layer height is smaller than the extrusion width and therefore depends on the diameter of the extruder nozzle. For example, the nozzle may have a diameter of 0.5-2 mm, preferably 0.8-1 mm. The width of the extrusion can then be, for example, 1 mm, the height of the layer is preferably 0.6-1 mm, more preferably 0.6-0.8 mm.

In a preferred embodiment, the printing head may of course comprise more than two printing units, these units are arranged in mutually spaced apart rows, the printing units in one row are adapted to print in a different plane than the printing units arranged in another row. The printing units in the same row, specifically the output ends of their nozzles, are preferably mutually offset only in the print plane. Typically, the number of printing units arranged in this way will be the same in each row. Thus, each row may contain multiple printing units mutually offset in the print plane, and printing units in different rows are mutually offset in the direction perpendicular to the print planes.

In practice, the printing units of each row can be located on a printing arm. The first arm is located mutually spaced apart from the second arm such that the printed layer in one plane is deposited on the already solidified layer in the previous plane. The printing heads on the individual arms are thus able to print the same motif in different planes simultaneously.

Although this printing head assembly is particularly suitable for repetitive single-purpose printing, the arrangement of the printing units in rows on the arms allows the printing head assembly to be easily adapted to print different objects if the individual arms are adjustable. The possibility of increasing the mutual spacing of the individual arms in the print plane allows the printing of mutually different motifs. On the other hand, the possibility of increasing the mutual spacing of the individual arms in the plane perpendicular to the print plane allows to change the height of the printed layer or to use a different printing filament.

In a preferred embodiment, the mutual height adjustability of the individual printing arms can be achieved by arranging the printing arms on a tilting arm that is rotatably connected to the printing head carrier and provided with a printing arm actuator.

The printing head assembly of the present invention is particularly suitable for a continuous printing of "endless"/strip or elongated objects. In this case, all printing units are printed simultaneously for most of the print time, only at the beginning of the object printing the printing units are gradually started in different planes perpendicular to the print plane and at the end of the object printing the printing units are gradually disconnected. At the end of the printed object, before the way back, it is necessary to rotate the printing head assembly or preferably to ensure that the printing units are tilted to the opposite height position, simultaneously with displacing the printing head assembly up or displacing the printing pad down, as appropriate. If the printing units are arranged on printing arms which are further arranged on a tilting arm, then the tilting of the printing units to the opposite height position at the end of the printed object can be simply ensured by rotating the tilting arm.

The printing head is mounted on the printing head carrier and together they form a printing head assembly that is adapted to move in a three-axis system relative to the printed object, with the axes perpendicular to each other. The movement of the printing head assembly is accomplished by a manipulator connected to the printing head carrier. The printing head carrier may be removably mounted on the printing head, or the printing head carrier may be an integral part of the printing head. The movement in some axes may be carried out by the manipulator of a printing pad that serves to apply the first layer and to carry the printed object. The printing pad is included in the printer as standard.

The printing unit comprises an extruder, filament feeder, cooling mechanism, and nozzle. Each extruder preferably has a dual filament feeder for smooth and error-free operation. In such an embodiment, the filament feeder is composed of a pair of complementary gears between which the filament is introduced, wherein the pair of complementary gears from two feeders of one printing unit located one above the other have different speeds such that the filament is loose without tension between them. The filament feeder further away from the nozzle, i.e., the top of the two filament feeders, is adapted such that its pair of gears rotates faster. Thus, the second, bottom filament feeder is supplied with a loose filament, because there is a certain slack on the filament between the filament feeders. By default, the upper pair of gears does not always rotate faster, but only at certain time intervals or when the filament is found to be too tight. For example, the bottom filament feeder may include a sensor providing information about filament tension, for example, it may measure torque on the bottom filament feeder drive or on its gears. This moment is greater when the filament is tighter. If the printer or control unit, etc., evaluates that the filament is too tight, it is ensured that the gears of the upper filament feeder rotate faster for a certain period of time to loosen the filament between the filament feeders.

It is also possible to provide the required filament loosening at regular intervals, for example, after every 100 or 1000 etc. revolutions of the filament feeder gears, the filament may be aligned between the feeders and subsequently the upper filament feeder performs e.g., one extra revolution or quarter revolution etc., whereby the filament is loosened to the required extent.

The filament feed speed depends on the speed of the gear pairs. Preferably, the complementary pairs of gears are spaced apart by a length greater than the diameter of one gear. The advantage of this design solution is that it guarantees smooth feeding of the filament into the extruder. The speed of the wheels is directly proportional to the print speed and the diameter of the filament being introduced. The standard filament diameter is 1.5-2 mm, in the present invention a filament diameter of 2.5-3.5 mm is preferably used, particularly preferably 3 mm. The print speed is preferably at least 200 mm/s, more preferably at least 250 mm/s, even more preferably at least 300 mm/s. The print speed is therefore the length of the trajectory of the nozzle/printing head movement in the print plane.

As can be seen from the above, the printing head assembly for the 3D printing device of the present invention can be up to several times faster than a conventional printing head that can only print layers in a single level.

Another object of the invention is also a 3D printer, e.g., a frame printer, which comprises the printing head assembly of the present invention described above. The 3D printer thus further comprises in particular a frame or other support structure and comprises a printing pad. The printing pad can be fixed or movable in an axis or axes. Preferably, the printing head assembly manipulator and the printing pad manipulator provide for mutual displacement of the printing units relative to the printing pad in three mutually perpendicular axes, wherein the displacement in each axis is preferably independent of the displacement in the other axes. Movement between the printing head and printing pad in more than three axes is also possible. In particular, it is possible to mount the printing head rotatably about an axis perpendicular to the printing pad, which is usually a vertical axis. The 3D printer then comprises an additional manipulator for rotating the printing head, or the entire printing head assembly, about this axis, or the manipulator providing the printing head displacement is further adapted for its rotation.

In the case of printing a larger number of individual objects, it is preferable if, for printing the peripheral contours, the 3D printer with the printing head assembly of the present invention is provided with at least one additional printing unit movable in all directions independently of the printing head assembly.

DESCRIPTION OF DRAWINGS

A summary of the invention is further clarified using exemplary embodiments thereof, which are described with reference to the accompanying drawings, in which.

EXEMPLARY EMBODIMENTS OF THE INVENTION

Said embodiments show exemplary embodiments of the invention, which, however, have no limiting effect from the point of view of the scope of protection. The object of the invention is a printing head assembly and a 3D printing device, or 3D printer, provided with the assembly.

Figure 1:
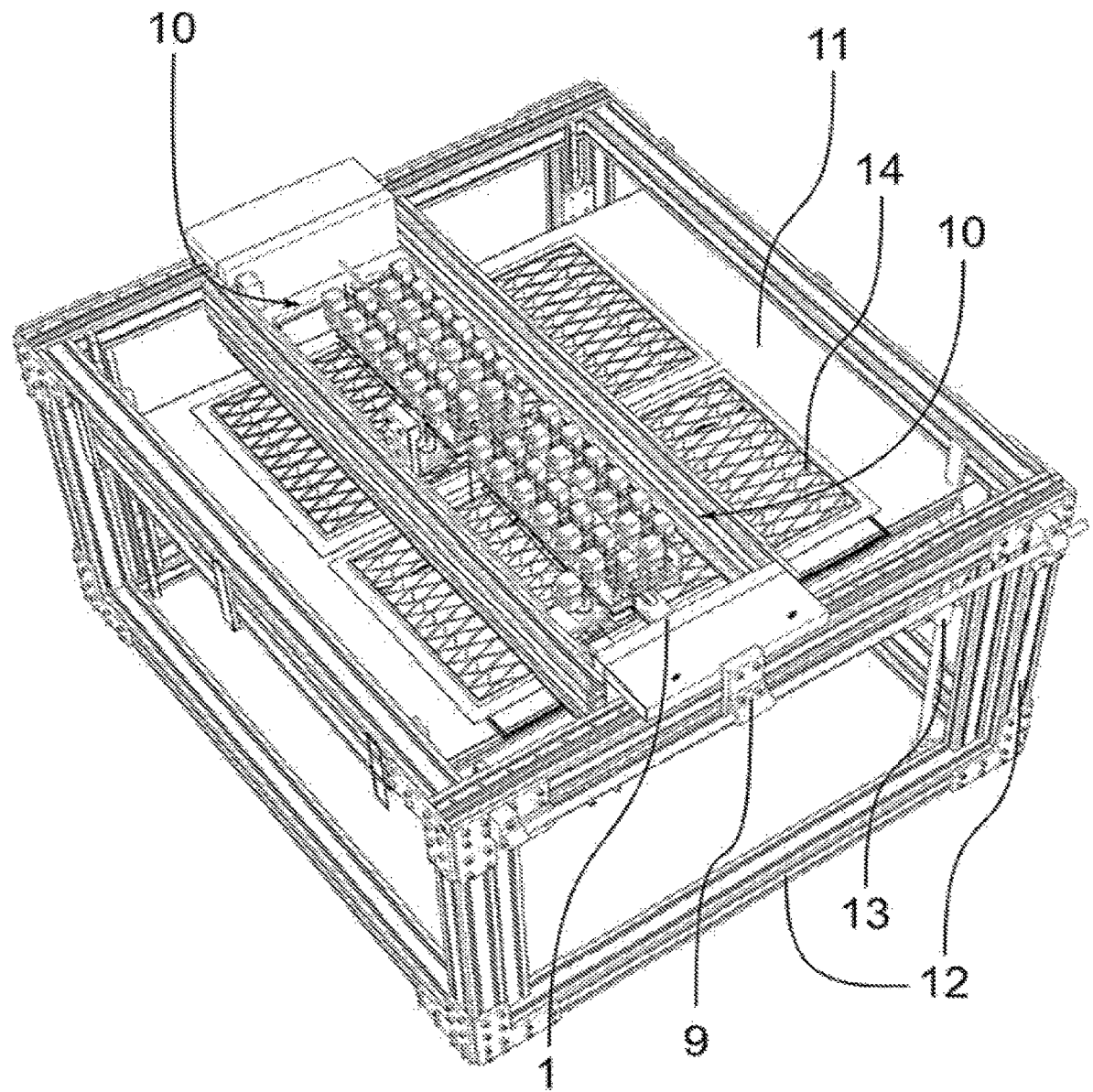
FIG. 1 shows schematically a 3D printer comprising the printing head assembly of the invention.

The 3D printer of the invention is shown in FIG. 1 and comprises a printing head assembly composed of a printing head carrier 1 and a printing head 10, and further comprises a manipulator 9, a printing pad 11, a printing pad manipulator 13, and a frame 12. In the embodiment shown, the 3D printer comprises two printing head assemblies, but generally can include only one or any higher number. The printing head 10 is mounted on the printing head carrier 1, which is mounted on the manipulator 9, which is adapted to perform movement in two mutually perpendicular axes—in the embodiment shown, the X and Y axes, which are parallel to the print plane, or all the print planes, which are horizontal here. The manipulator 9 is mounted on the frame 12 and preferably comprises a separate drive for movement in each of the two axes. The printing pad 11 is mounted on the printing pad manipulator 13, which is adapted to perform movement along a single axis perpendicular to the printing pad 11 and the print planes, and is horizontally located in the frame 12. Embodiments where the printing pad 11 and/or the print planes deviate from the horizontal direction are also possible.

Figure 2:
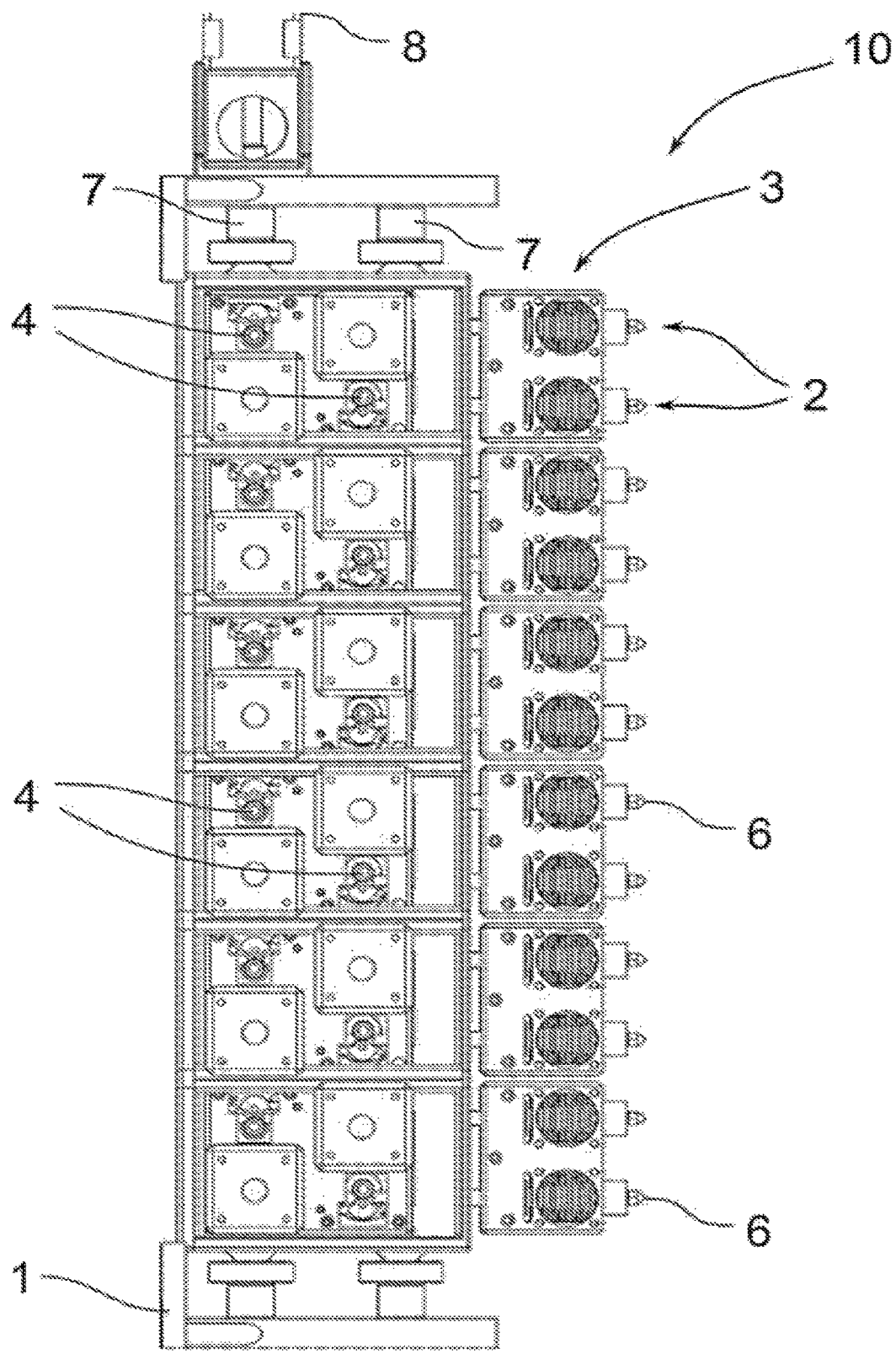
FIG. 2 shows schematically a printing head assembly of the 3D printer as seen from the front.

The 3D printer printing head assembly is shown in FIG. 2 and comprises the printing head carrier 1, two printing arms 7, printing arm actuator 8, and printing units 2. Specifically in this embodiment, each printing arm 7 comprises a row of twelve printing units 2 which are immovably located relative to each other in a single axis on the printing arm 7. The pair of the printing arms 7 are mounted on tilting arms mounted on the printing arm actuator 8 allowing adjustment of the printing head 10. This adjustment, carried out by moving the printing arms 7, for example by rotating or vertically displacing them, allows the printing arms 7, and with them the rows of printing units 2, to be in different positions relative to each other on the vertical axis, thereby allowing two consecutive layers to be printed. First, a first layer is printed by the printing units 2 located on the first row of the printing arm 7, then, at a certain time interval, another layer is printed on this first layer by the printing units 2 located on the second row of the second printing arm 7, which is displaced on the vertical axis by a layer thickness higher than the first row. The deposition of the printed material takes place layer by layer, the connection of the individual layers is caused by adhesive or diffusion forces. The resulting printed object 14 is then formed by these layers. Said time interval is ensured by mutual displacement of the rows, or corresponding printing units 2, i.e., printing units 2 printing on each other, in different rows, in a plane parallel to the print plane.

Figure 3:
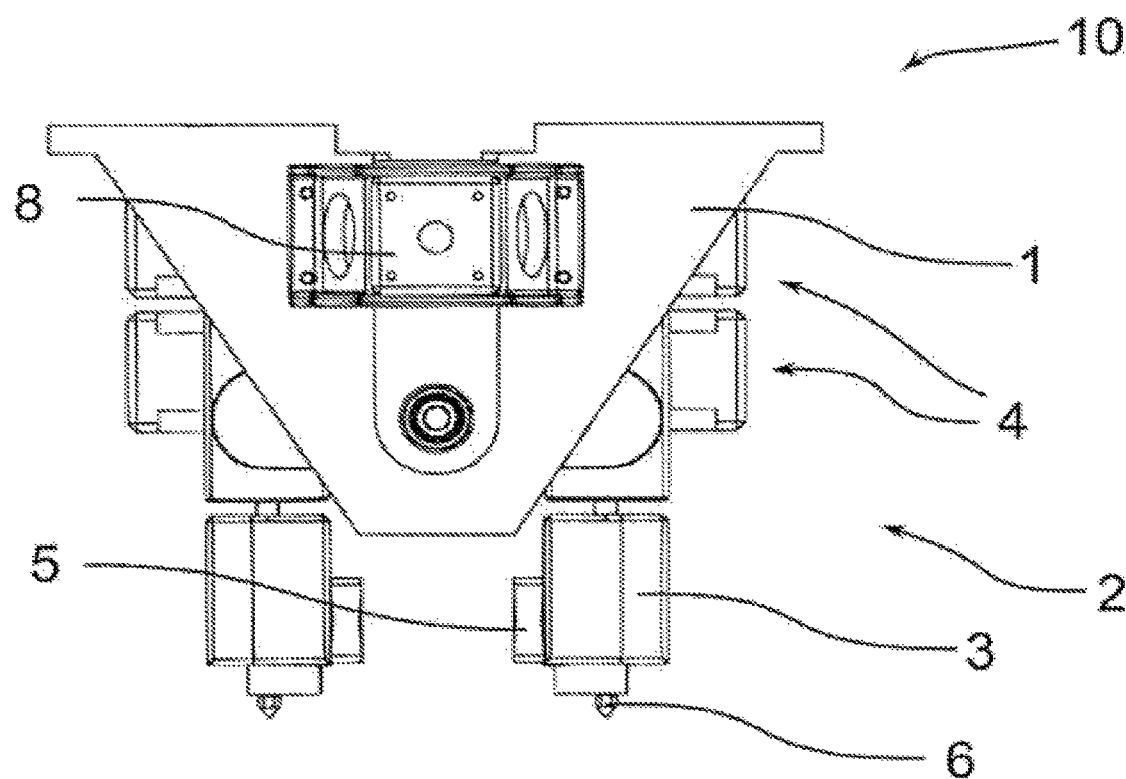
FIG. 3 shows schematically the printing head assembly of the 3D printer as seen from the side.
Figure 4:
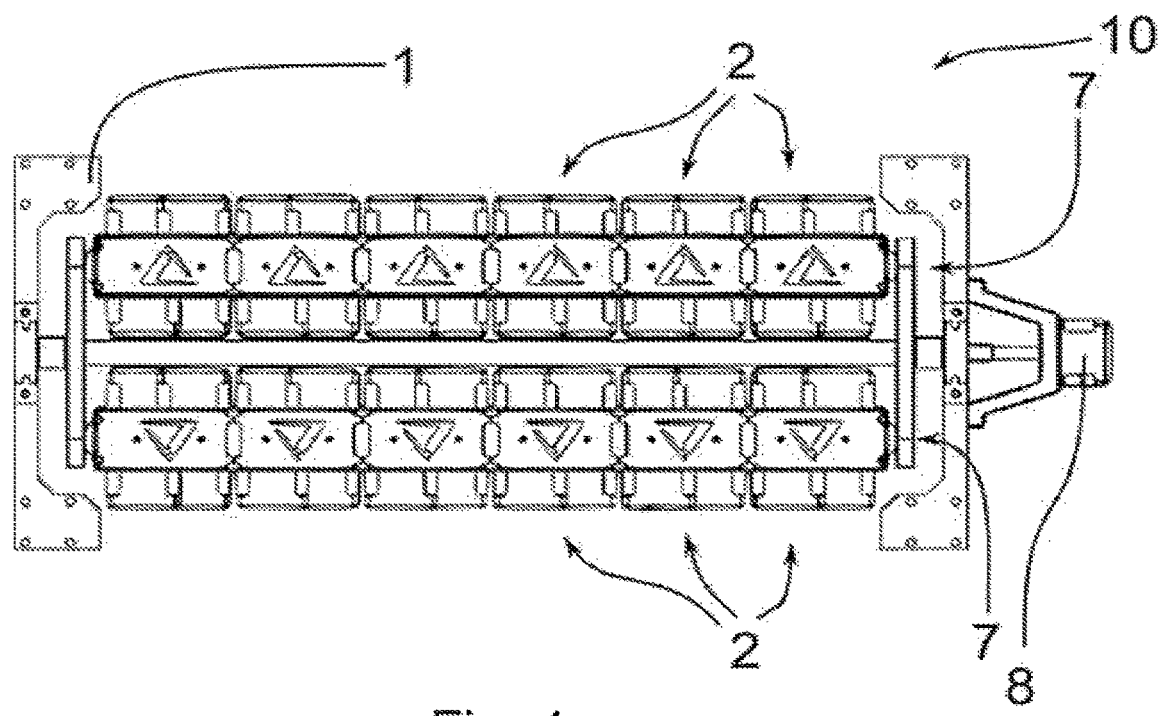
FIG. 4 shows a top view of the printing head assembly of FIGS. 2 and 3.
Figure 5:
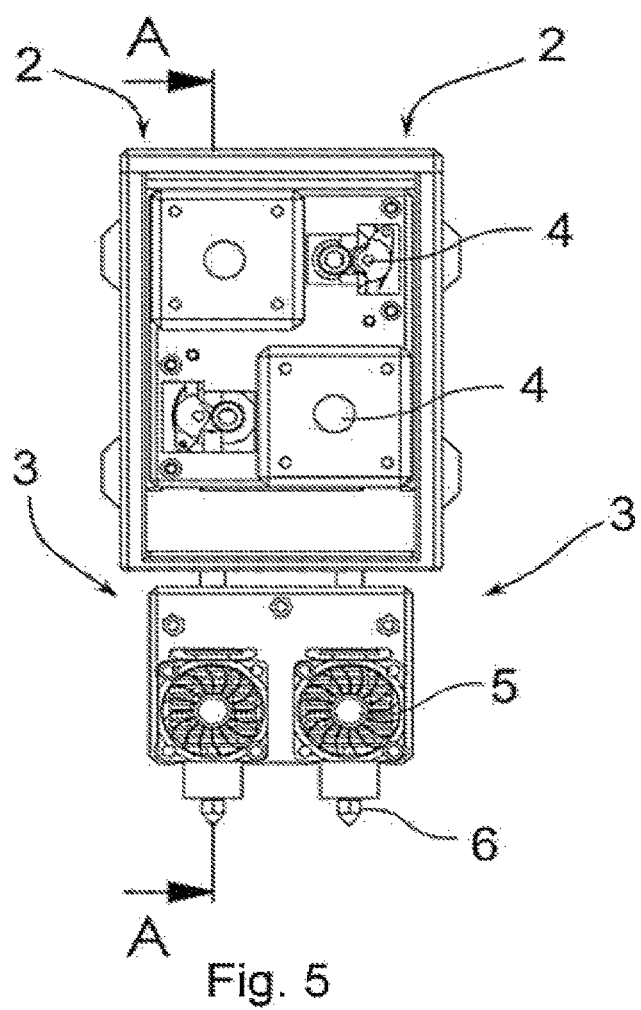
FIG. 5 shows a printing head segment containing two printing units.
Figure 6:
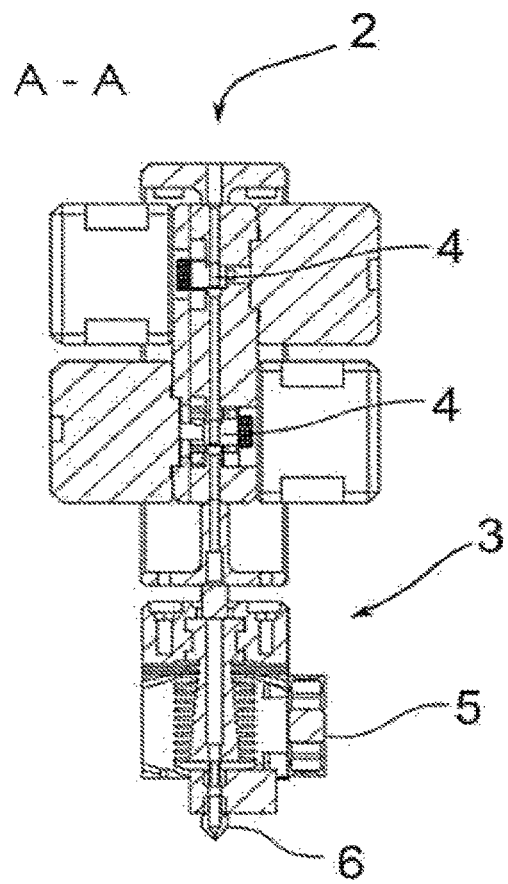
FIG. 6 shows an A-A section of FIG. 4 with a plane perpendicular to the print plane through this segment through the center of the filament passage space.
Figure 7:
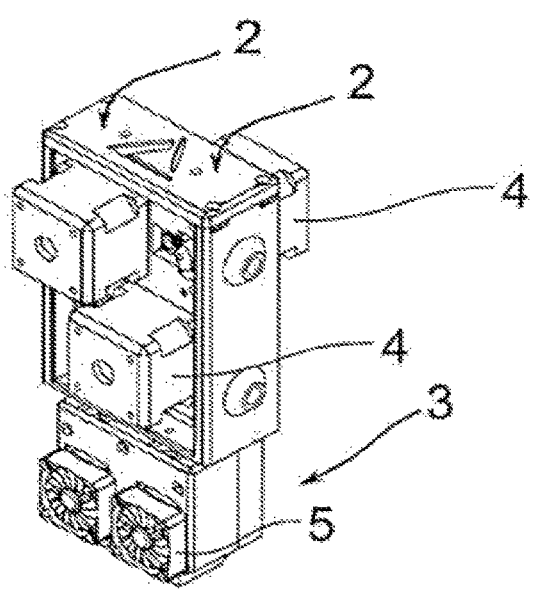
FIG. 7 shows the printing head segment of FIGS. 6 and 7 in perspective view.

The arrangement of the printing units 2 in rows is further shown in FIGS. 3 and 4. In particular, FIG. 3 shows the offset of the printing units 2 in different rows in a plane parallel to the printing pad 11 in the print direction. At the same time, the bottom ends of the printing units 2, i.e., their nozzles 6, are arranged vertically in various rows, although this relatively small offset is not readily apparent in FIG. 3. This offset is more pronounced in FIG. 8. In the embodiment shown, the printing units 2 are arranged in pairs in segments as shown in FIGS. 5, 6, and 7. Each printing unit 2 comprises an extruder 3, filament feeder 4, cooling mechanism 5, and nozzle 6, wherein these parts are arranged such that the filament can pass through them. The filament feeder 4 is located at the top of the printing unit 2, in the embodiment shown there are always two filament feeders 4. Each filament feeder 4 comprises a drive, in particular a stepper motor, and a pair of gears between which there is a space adapted for mounting the filament such that the filament is displaced by rotation of the gears. Each of the gears in the given filament feeder 4 may have its own drive, or they may be connected such that the torque is transferred from one to the other and rotated by a single drive. Preferably, each of the pair of filament feeders 4 has a different speed.

Under the filament feeders 4, there is the extruder 3, which ensures that the filament is heated to the desired printing temperature such that it can be subsequently extruded through the nozzle 6 at the bottom part of the printing unit 2. The extruder 3 preferably comprises a heat exchanger, as is customary, and the print speed, i.e., the extrusion of the filament from the nozzle 6, is determined particularly by the filament supply speed.

The manipulator 9 and/or the printing pad manipulator 13 may be implemented, for example, by means of servomotors. For example, the servomotor may rotate a helix rod that performs the movement of the printing head carrier 1. For example, bands or belts, toothed combs, etc. can also be used. The cooling mechanism 5 may be implemented using a fan. Alternatively, it can be implemented using nozzles supplying compressed air, supplied to the nozzles from, for example, a compressor, cylinder, etc. An advantage of compressed air nozzles is in particular the precision of directing the cooling to the desired location and also the higher cooling intensity.

The control of the printing process is carried out, for example, by means of a computer to which the printing head 10 is communication connected. The communication connection means such a connection that allows the transfer of information between the individual communication connected components. The communication connection can be implemented by connecting components, for example, via optical, network data or other cables, or wirelessly using LPWAN, Bluetooth, WIFI, or other interfaces. The method of connection is not limiting in terms of the embodiment of the invention. The information is, in the context of the present invention, any information necessary for the operation of the device as a whole. In particular, this includes information about the position of the printing head 10, the position of the printing pad 11, the model of the printed object 14, the type of filament, the extrusion temperature, the cooling intensity, the extrusion width, the layer height, the state of the printed object 14, or technical parameters, or the positions of the 3D printer components relative to each other.

In an exemplary embodiment of the technical solution, the operation of the 3D printing device is as follows. From the filament dispenser, the filament is guided through a flexible hose connecting the filament dispenser and the printing unit 2, the filament is subsequently fed into the filament feeder 4, where a double filament feeder 4 is used, composed of a pair of complementary gears, where the speed of the first pair of gears is different from the speed of the second pair of gears. The filament feeder 4 pushes the filament at a certain speed into the extruder 3, and after heating to the appropriate temperature, the filament is subsequently extruded through the nozzle 6.

Figure 8:
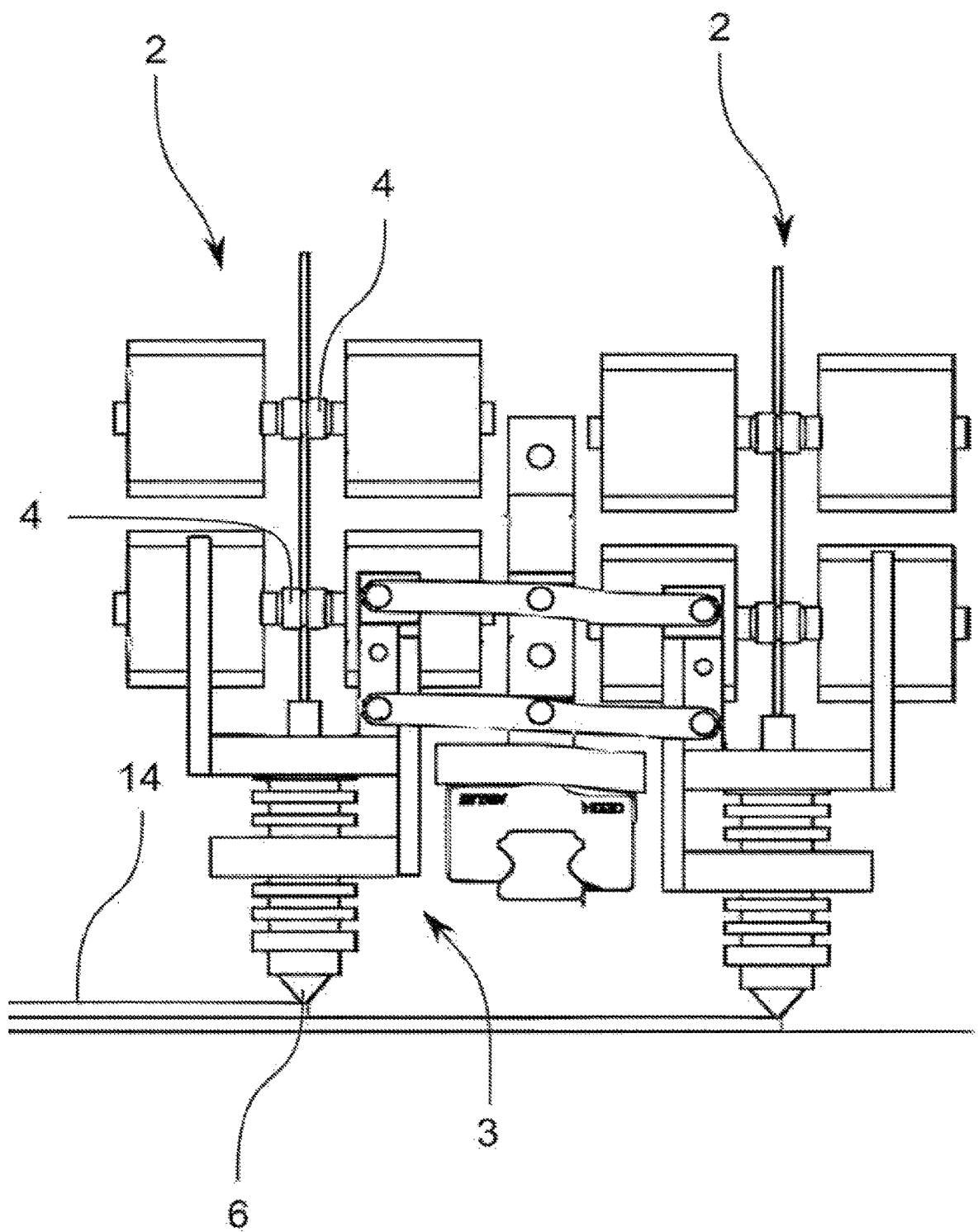
FIG. 8 shows schematically two printing units arranged at a mutual spacing, both in the print plane and in a plane perpendicular to the print plane, when passing over the printed object to the right.
Figure 9:
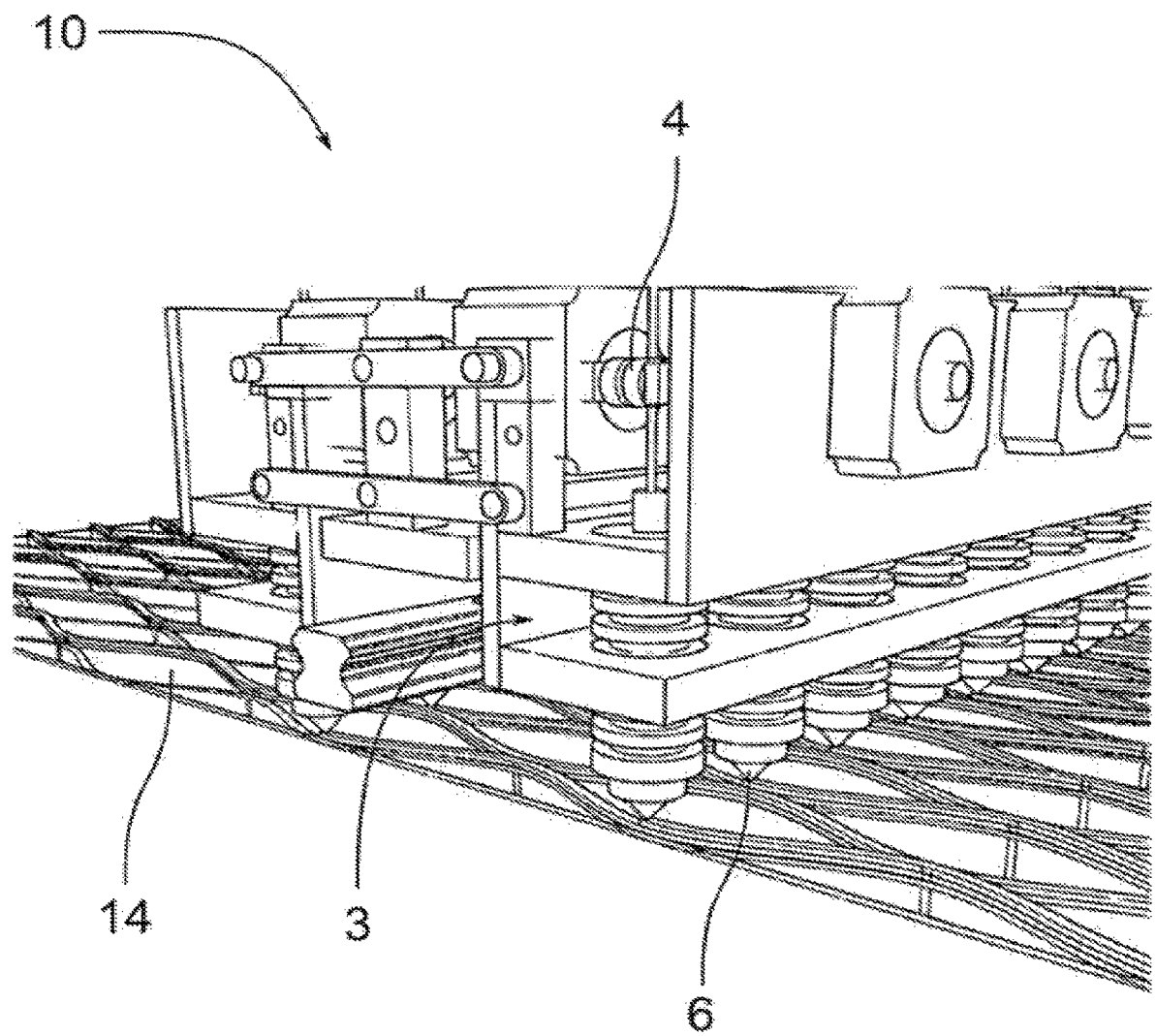
FIG. 9 shows schematically two rows of printing units arranged at a mutual spacing both, both in the print plane and in a plane perpendicular to the print plane, when passing over the printed object to the left.

As can be seen in FIG. 8, by using the printing units 2 spaced apart in a plane parallel to the print planes (i.e., in the horizontal direction in the embodiment shown) and in a plane perpendicular to the print planes (i.e., in the vertical direction in the embodiment shown), it is possible to apply two layers simultaneously, wherein the top one of these layers is printed with a certain delay. As can be seen in FIG. 9, preferably the printed object 14 is formed by a pattern that repeats periodically in the print direction, with a period equal to the distance of the rows of printing units 2. When printing in a given set of print planes, the printing head 10 in the embodiment shown is then moved simultaneously in both the X and Y axes to create the desired pattern, in the illustrated embodiment, the wave pattern.

In a preferred embodiment, after printing is completed in one set of print planes, where the set is a plurality of print planes in which the printing is performed simultaneously, the embodiment above has two, the printing arms 7 are tilted, thereby bringing the first row of printing units 2 to an opposite height position with respect to the second row. In other words, the row that was located higher is now located lower than the second row, so it prints the bottom layer. At the same time, the print direction is changed. Tilting the position of the printing arms 7, means that one row on the printing arm 7 is displaced relative to the other, parallel row on the other printing arm 7. In some embodiments, the two rows may be located on one common printing arm 7, the movement of which adjusts the relative position of the rows in a plane perpendicular to the print plane. In the embodiment shown, as can be seen in particular in FIGS. 2 and 4, there are two printing arms 7, but they have a common printing arm actuator 8 and are immobile relative to each other. Both printing arms 7 rotate simultaneously about an axis passing between them, wherein the printing arm actuator 8 is located in this axis.

By way of example, the printing head 10 is composed of 24 printing units 2, wherein the 3D printer further comprises two additional printing units 2 to enable independent printing of edge contours in an independent axis. These additional printing units 2 may be part of the assembly of the invention or they may be part of a printer outside the printing head assembly. They can move independently of the printing head 10. They can also be directly part of the printing head 10, wherein their independent movement is made possible by suitable manipulators and by mounting independent of the rows of printing units 2. These additional printing units 2 are separate, meaning in the embodiment shown, they are not in segments of two like the other twenty-four printing units 2, and they comprise their own manipulator for movement at least in the print plane. The additional printing units 2 may or may not be arranged in pairs, or in numbers corresponding to the number of rows on the printing head 10, to also print in multiple print planes simultaneously. In a preferred embodiment, the 24 printing units 2 located in two rows on the printing arms 7 and the other two printing units 2 in an independent axis print one object simultaneously. In alternative embodiments, the number of printing units 2 in each row may be different, and in some embodiments, the number in different rows may be different. Preferably, however, the number of printing units 2 in all rows is the same. Thus, the number of printing units 2 in one row may be substantially arbitrary, and embodiments with a total of two printing units 2 that are mutually offset at least in a direction perpendicular to the print plane are possible. Embodiments with, for example, ten printing units 2 in two rows, or, for example, thirty or fifty etc. printing units 2 in two rows are also possible. In further alternative embodiments, the printing head 10 may include even more than two rows of printing units 2, so it is adapted to print in more than two print planes simultaneously. In some embodiments, the printing units 2 in one row may be mutually displaceable in the print plane, so the distance of adjacent printing units 2 may be adjusted, for example, in a direction perpendicular to the print direction, i.e., the distance of adjacent extruded filament lines may be adjusted. Preferably, alternatively or additionally, the width of the printing layer, i.e., the size of the vertical offset of the printing units 2 in different rows, is also adjustable. At the same time, the extrusion width is preferably adjustable, wherein this adjustment may require replacement of the nozzles 6.

The arrangement of the printing arms 7 and their printing arm actuator 8 corresponds to the number and arrangement of the rows of printing units 2. For example, in a three-row embodiment, the middle row may always print the middle layer, while the outermost rows are adjustable, by rotating and/or displacing, such that the bottom layer is first printed by one of the outermost rows, and after the completion of a given set of layers, the print direction and movement of the printing arms 7 is reversed and the bottom layer is printed by the second of the outermost rows. In an alternative embodiment, tilting of the printing arms 7 may not be necessary to enable printing of the next set of layers. Instead, for example, the entire printing head assembly can be rotated about the Z-axis by a suitable manipulator.

In further alternative embodiments, the manipulator 9 may carry out movement in all three axes X, Y, Z, such that the printing pad 11 does not have to be movable. In a further embodiment, the manipulator 9 may carry out, for example, movement in the Y- and Z-axes, wherein movement in the X-axis is carried out by the printing pad manipulator 13. In further embodiments, each printing unit 2 may be separate, i.e., they do not have to be arranged in segments of pairs, or the printing units 2 may be in segments of more than two. In further embodiments, the printing unit 2 may comprise a single filament feeder 4.

Figure 10:
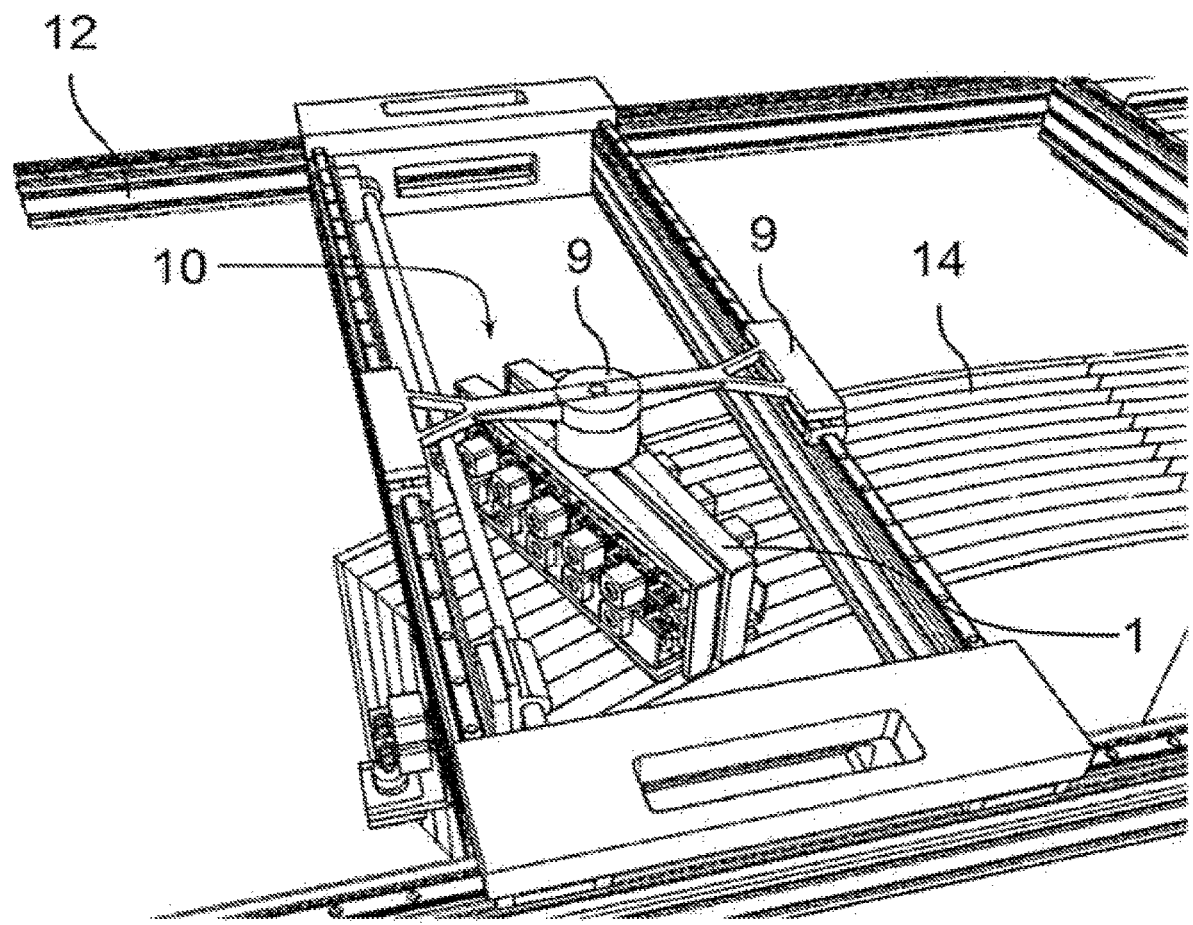
FIG. 10 shows a perspective view of an alternative 3D printer embodiment, in which the printing head assembly is additionally rotatable about the vertical axis.
Figure 11:
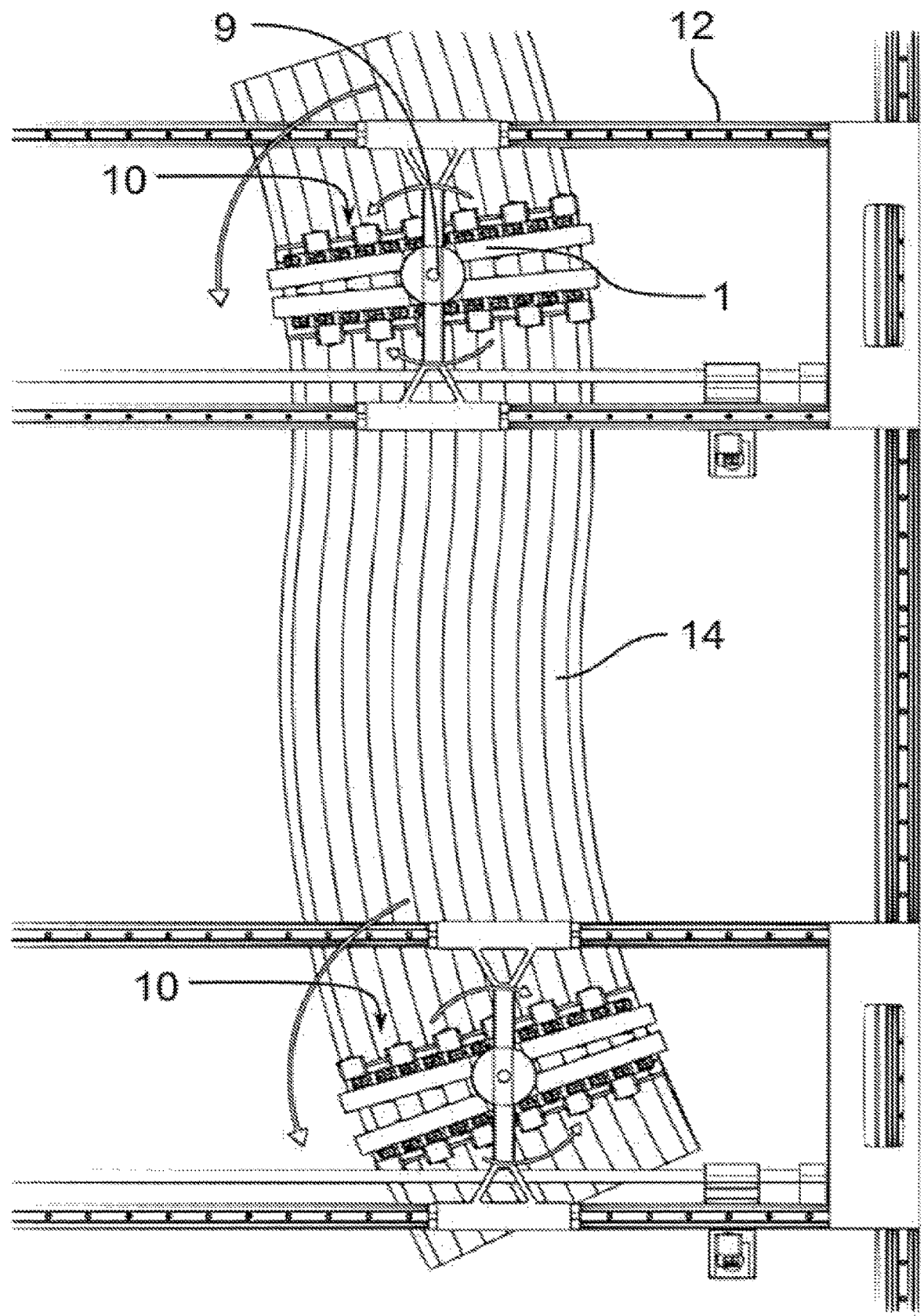
FIG. 11 shows a top view of the 3D printer of FIG. 10, wherein it can be seen in the figure that this 3D printer comprises two rotatable printing heads.

In the exemplary embodiment of FIGS. 10 and 11, the 3D printer described above is further modified such that the printing head assembly is additionally rotatable about an axis perpendicular to the printing pad 11. The manipulator 9 includes here, in addition to the parts for providing the displacement of the printing head assembly, a part for providing its rotation. The rotation is allowed within a certain range, for example −90° to 90° relative to the rotation of the assembly in an embodiment where it is not rotatable. Alternatively, this interval is for example only −60° to 60°, −30° to 30°, and in some embodiments, it may not be symmetrical, i.e., may be for example −60° to 30° relative to the rotation of FIG. 1. The boundaries of this interval are chosen in particular with regard to preventing the filament feeds to the printing units 2 (not shown) from being torn off, and also with regard to the printed objects 14. The center of rotation is preferably in the center of the printing head assembly when viewed from above. This embodiment is preferable especially for printing printed objects 14 that are significantly curved or rounded. In the embodiment of FIG. 1, the printing of curved shapes requires a combined displacement in both the X- and Y-horizontal axes, which can place significant stress on the manipulator 9. In the embodiment of FIG. 10, rotation about the vertical axis allows to reduce the stress on the displaceable parts of the manipulator 9.

As can be seen from FIG. 11, in this exemplary embodiment, the rows of printing units 2 can also be rotated relative to each other, which can be achieved by a separate rotatable mounting of rows and rotatable part of the manipulator 9. This rotation of the rows is suitable for printing curved motifs, as each printing unit can print on a slightly different trajectory in this case, as can also be seen in the pictures. When the assembly is displaced approximately perpendicular to the print direction, i.e., when the print line is completed, it is then preferable to adjust the relative inclination of the rows for curved printed objects 14. In addition to this, it is further preferred when the filament feeders 4 are independent of each other between the different printing units 2 such that different printing units can output different amounts of extruded filament in the same time period. This is because it is clear that when the printing unit further away from the center of curvature of the printed object 4 moves along a longer trajectory, it should preferably also extrude more filament compared to units closer to the center of curvature. As can be seen in FIG. 11, the 3D printer may comprise two rotatable printing head assemblies. Each printing head may then print its own printed object 14 or may print a part of a common printed object 14.

The alternatives described above may be combined, provided that their nature does not directly exclude it. Thus, for example, the printing head assembly of the invention may combine different numbers and arrangements of printing units 2 with different cooling methods, differently made printing arms 7 or printing arm actuators 8, etc. The 3D printer of the invention may also comprise a plurality of differently made printing head assemblies, which may differ from each other, for example, in the number and/or arrangement of the printing units 2, the width of the extrusion, the type of the cooling mechanism 5, or the type of filament, etc.

INDUSTRIAL APPLICABILITY

The solution described above can be used for 3D printing of various objects, but it will provide the greatest advantages when printing regular objects with repeating motifs, e.g., modular building blocks.

LIST OF REFERENCE SIGNS

1—Printing head carrier
2—Printing unit
3—Extruder
4—Filament feeder
5—Cooling mechanism
6—Nozzle
7—Printing arm
8—printing arm actuator
9—Manipulator
10—Printing head
11—Printing pad
12—Frame
13—Printing pad manipulator
14—Printed object

The invention claimed is:

1. A 3D printer printing head assembly comprising a printing head carrier and a printing head comprising at least four printing units, each printing unit comprising an extruder, filament feeder, cooling mechanism, and nozzle, wherein the printing units are adapted to print simultaneously in different, mutually offset print planes, wherein when the assembly is used in a 3D printer, each print plane is a plane in which a layer of a printed object is formed and each print plane is parallel with printing pad of the 3D printer, wherein the printing units are arranged in at least two mutually spaced rows, and wherein the printing units in one row are adapted to print in a different print plane than the printing units arranged in another row.

2. The 3D printer printing head assembly of claim 1, wherein it further comprises at least two printing arms connected to the printing head carrier at a mutual spacing, wherein the printing units of each row are located on a different one of the printing arms.

3. The 3D printer printing head assembly of claim 2, wherein the printing arms are arranged on a tilting arm that is rotatably connected to the printing head carrier and provided with a printing arm actuator.

4. The 3D printer printing head assembly of claim 1, wherein the mutual spacing of the printing units in the print plane is adjustable.

5. The 3D printer printing head assembly of claim 1, wherein each printing unit comprises two successive filament feeders, wherein each filament feeder comprises a pair of gears adapted to guide the filament therebetween.

6. The 3D printer printing head assembly of claim 5, wherein on each printing unit, the filament feeder further away from the nozzle is adapted to rotate the gears faster during a portion of the printing process than the filament feeder closer to the nozzle.

7. A 3D printer comprising a frame and a printing pad, wherein it further comprises the 3D printer printing head assembly of claim 1 and a manipulator for displacing the printing head.

8. The 3D printer of claim 7, wherein it further comprises at least one additional printing unit adapted to move in a plane parallel to the print planes independently of the other printing units.

9. The 3D printer of claim 7, wherein the printing head is rotatably attached to the frame about an axis perpendicular to the printing pad, wherein the 3D printer further comprises a manipulator for rotating the printing head.

* * * * *